United States Patent
Chien et al.

(10) Patent No.: US 12,548,556 B2
(45) Date of Patent: Feb. 10, 2026

(54) METHOD AND SYSTEM FOR FAIR SPEECH EMOTION RECOGNITION

(71) Applicant: National Tsing Hua University, Hsinchu (TW)

(72) Inventors: Woan-Shiuan Chien, Hsinchu (TW); Chi-Chun Lee, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 248 days.

(21) Appl. No.: 18/380,847

(22) Filed: Oct. 17, 2023

(65) Prior Publication Data
US 2024/0404511 A1  Dec. 5, 2024

(30) Foreign Application Priority Data
Jun. 2, 2023  (TW) ................ 112120746

(51) Int. Cl.
*G10L 15/30* (2013.01)
*G10L 15/06* (2013.01)
(Continued)

(52) U.S. Cl.
CPC ............ *G10L 15/063* (2013.01); *G10L 25/30* (2013.01); *G10L 25/63* (2013.01)

(58) Field of Classification Search
CPC ........ G10L 15/063; G10L 25/30; G10L 25/63
(Continued)

(56) References Cited

U.S. PATENT DOCUMENTS 11,227,624 B2 * 1/2022 Deshpande ............ G10L 15/02
12,229,962 B1 * 2/2025 Aravamudan ......... G16H 15/00
(Continued)

FOREIGN PATENT DOCUMENTS

TW  202141343 A  11/2021
TW  202213193 A  4/2022
(Continued)

OTHER PUBLICATIONS

M. Abdelwahab and C. Busso, "Domain Adversarial for Acoustic Emotion Recognition," in IEEE/ACM Transactions on Audio, Speech, and Language Processing, vol. 26, No. 12, pp. 2423-2435, Dec. 2018, doi: 10.1109/TASLP.2018.2867099.keywords: {Emotion recognition; Training; Speech recognition; Data models; Tes (Year: 2018).*
(Continued)

*Primary Examiner* — Bharatkumar S Shah
(74) *Attorney, Agent, or Firm* — ScienBiziP, P.C.

(57) ABSTRACT

A computer-implemented method for speech emotion recognition is provided. The computer-implemented method includes an emotion prediction corresponding to speech data that is generated based on the speech data and a speech emotion recognition model without bias. The speech emotion recognition model without bias is trained by training a fairness-constrained adversarial network based on a labeled training set with known bias and a loss function. The fairness-constrained adversarial network includes a domain classifier for bias classification and the speech emotion recognition model. The loss function used for training the fairness-constrained adversarial network is positively related to a Wasserstein distance (WD) loss.

17 Claims, 6 Drawing Sheets

(51) Int. Cl.
   *G10L 25/30*   (2013.01)
   *G10L 25/63*   (2013.01)
(58) Field of Classification Search
   USPC .......................................................... 704/200
   See application file for complete search history.

(56) References Cited

U.S. PATENT DOCUMENTS

| | | | |
|---|---|---|---|
| 12,250,201 B1* | 3/2025 | Rosenoer | ................ H04L 41/16 |
| 2020/0286506 A1* | 9/2020 | Deshpande | ............. G10L 25/63 |
| 2020/0335086 A1* | 10/2020 | Paraskevopoulos | ... G06N 3/088 |
| 2022/0328065 A1* | 10/2022 | Li | ........................ G06N 3/0442 |
| 2022/0351068 A1 | 11/2022 | Mishraky et al. | |
| 2022/0374637 A1* | 11/2022 | Liu | ......................... G10L 15/16 |
| 2023/0069908 A1* | 3/2023 | Ando | ...................... G10L 15/22 |
| 2024/0404511 A1* | 12/2024 | Chien | .................. G10L 15/063 |
| 2025/0022314 A1* | 1/2025 | Wei | ...................... G06N 3/0464 |

FOREIGN PATENT DOCUMENTS

| | | | | |
|---|---|---|---|---|
| TW | 202309876 A | 3/2023 | | |
| WO | WO-2024186954 A2 * | 9/2024 | ............ | G06Q 50/26 |

OTHER PUBLICATIONS

M. Abdelwahab and C. Busso, "Domain Adversarial for Acoustic Emotion Recognition," in IEEE/ACM Transactions on Audio, Speech, and Language Processing, vol. 26, No. 12, pp. 2423-2435, Dec. 2018, doi: 10.1109/TASLP.2018.2867099.keywords: { Emotion recognition; Training; Speech recognition; Data models; (Year: 2018).*

* cited by examiner

METHOD AND SYSTEM FOR FAIR SPEECH EMOTION RECOGNITION

CROSS-REFERENCE TO RELATED APPLICATION

The present application claims the benefit of and priority to Taiwan Patent Application No. 112,120,746, filed on Jun. 2, 2023, the contents of which are hereby fully incorporated herein by reference for all purposes.

FIELD

The present disclosure generally relates to speech emotion recognition and, more particularly, to method and system that address evaluator bias issues.

BACKGROUND

Speech Emotion Recognition (SER) plays a pivotal role in many speech-based solutions. However, there are several unique fairness-related challenges in the field of speech emotion recognition that have become increasingly evident as the technology has evolved. For instance, when evaluators provide emotion perceptions based on their inherent biases, it can lead to varying assessment results, highlighting the issue of evaluator bias.

Past approaches have attempted to address these bias issues by improving the composition of the dataset itself or by adjusting the weight proportions of the data. However, these methods are often domain-specific when addressing bias issues and cannot be universally applied, requiring more training data.

Furthermore, previous technologies have not provided users with sufficient transparency in achieving fairness, preventing them from clearly understanding the different results given by different evaluators. This has, to some extent, led to concerns about the potential "black box" nature of machine learning systems and has limited the fairness of the system in practical applications.

SUMMARY

In view of the above, the present disclosure provides a speech emotion recognition method and system that can effectively learn and handle biases, thereby enhancing the fairness of speech emotion recognition.

A first aspect of the present disclosure provides a computer-implemented method for training a speech emotion recognition model. The computer-implemented method includes: providing a fairness-constrained adversarial network including a domain classifier and a speech emotion recognition model, the domain classifier being configured to classify a bias in an input data, and the speech emotion recognition model being configured to determine an emotion corresponding to the input data; and training the fairness-constrained adversarial network based on a labeled training set with known bias and a first loss function to obtain the speech emotion recognition model without bias. The first loss function is positively related to a Wasserstein distance loss.

A second aspect of the present disclosure provides a computer-implemented method for speech emotion recognition. The computer-implemented method includes: receiving speech data; and generating an emotion prediction result corresponding to the speech data based on the speech data and a speech emotion recognition model without bias. The speech emotion recognition model without bias is trained by training a fairness-constrained adversarial network based on a labeled training set with known bias and a first loss function. The first loss function is positively related to a Wasserstein distance loss. The fairness-constrained adversarial network includes a domain classifier for bias classification and the speech emotion recognition model.

A third aspect of the present disclosure provides a non-transitory computer-readable medium, including at least one instruction, when executed by a processor of an electronic device, causes the electronic device to: receive speech data; and generate an emotion prediction result corresponding to the speech data based on the speech data and a speech emotion recognition model without bias. The speech emotion recognition model without bias is trained by training a fairness-constrained adversarial network based on a labeled training set with known bias and a first loss function. The first loss function is positively related to a Wasserstein distance loss. The fairness-constrained adversarial network includes a domain classifier for bias classification and the speech emotion recognition model.

DETAILED DESCRIPTION

The following will refer to the relevant drawings to describe implementations of a battery system for an electric vehicle in the present disclosure, in which the same components will be identified by the same reference symbols.

The following description includes specific information regarding the exemplary implementations of the present disclosure. The accompanying detailed description and drawings of the present disclosure are intended to illustrate the exemplary implementations only. However, the present disclosure is not limited to these exemplary implementations. Those skilled in the art will appreciate that various modifications and alternative implementations of the present disclosure are possible. In addition, the drawings and examples in the present disclosure are generally not drawn to scale and do not correspond to actual relative sizes.

The term "couple" is defined as a connection, whether direct or indirect, through an intermediate component, and is not necessarily limited to a physical connection. When the terms "comprising" or "including" are used, they mean "including but not limited to," and explicitly indicate an open relationship between the combination, group, series, and the like.

A plurality of example implementations of the present disclosure describe methods and systems for speech emotion recognition that can effectively learn and handle biases.

In some implementations, the aforementioned biases include evaluator biases. Specifically, evaluator bias refers to the subjective bias that an evaluator may have when assessing an item or situation. This bias may be caused by the evaluator's personal experiences, beliefs, values, or identity characteristics such as race, gender, and age. In the field of machine learning, if the training data for a model is annotated by evaluators, then evaluator bias can affect the annotation results and ultimately the training outcomes and performance of the model. For example, in training data related to speech emotion recognition, evaluators need to annotate the emotions of speech samples. However, evaluators of different types (e.g., gender, race, age group, etc.) may have different interpretations and understandings of the emotions of the same speech sample, leading to evaluator bias. This can result in the trained model being biased towards the perspectives of certain evaluators.

In some implementations, the aforementioned biases include binary biases, such as evaluator gender bias. In the following disclosure, the evaluator gender bias will be used as an example to illustrate the speech emotion recognition method and system of the disclosure. However, those skilled in the art should understand, under the technical concepts described by the implementations of the disclosure, other types of biases can also be applied.

Speech Emotion Recognition Model without Bias

Figure 1:
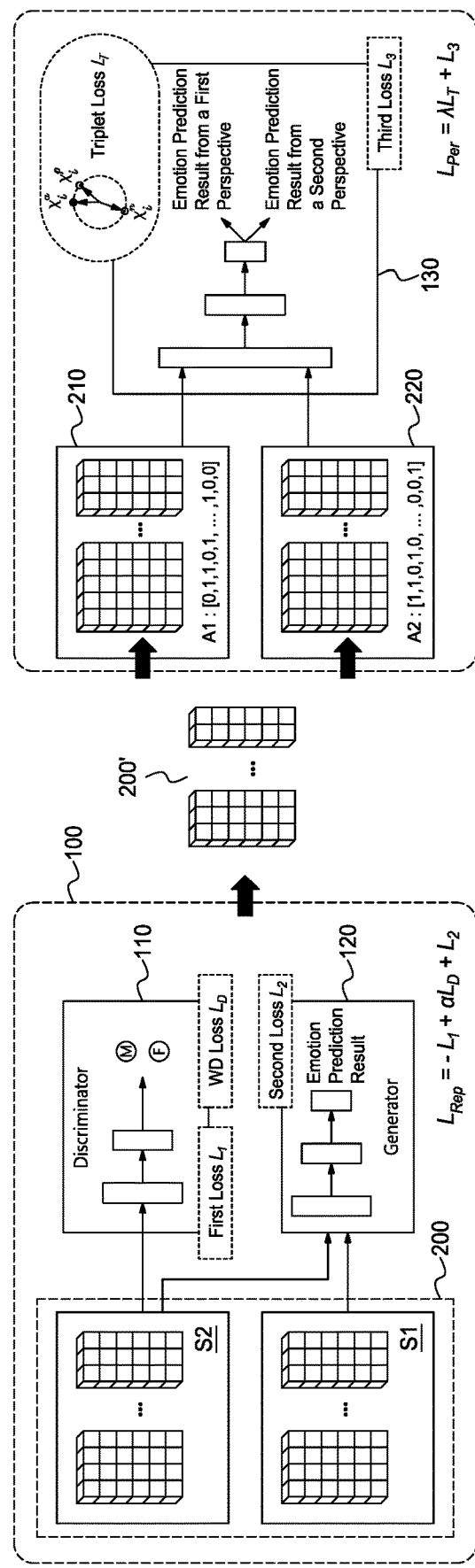
FIG. 1 illustrates a schematic diagram of training speech emotion recognition models according to an example implementation of the present disclosure.
Figure 2:
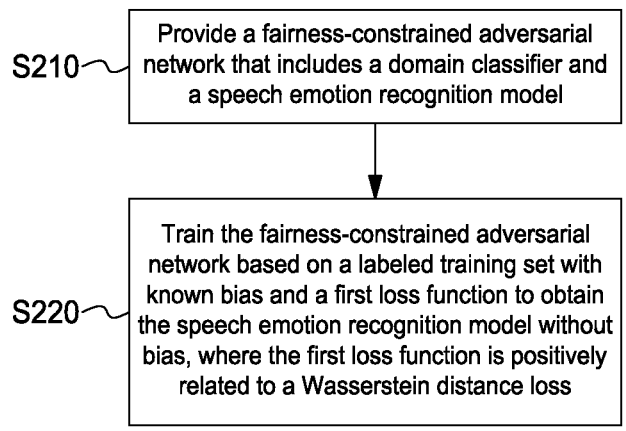
FIG. 2 illustrates a flowchart for training a speech emotion recognition model without bias according to an example implementation of the present disclosure.

FIG. 1 illustrates a schematic diagram of training speech emotion recognition models according to an example implementation of the present disclosure. FIG. 2 illustrates a flowchart for training a speech emotion recognition model without bias according to an example implementation of the present disclosure.

Referring to FIGS. 1 and 2, to train a speech emotion recognition model without bias, which may be also referred to as an unbiased speech emotion recognition model, a Fairness-Constrained Adversarial Network (FCAN) 100 may be provided in action S210. The FCAN 100 may include a domain classifier 110 and a speech emotion recognition model 120.

Specifically, the domain classifier 110 may act as the discriminator of the FCAN 100 and be configured to classify biases in the input data.

In some implementations, the input data may include speech data with emotion label(s) or feature(s) with emotion label(s), and the domain classifier 110 classifies the input data with "a first bias type" or "a second bias type". For example, the domain classifier 110 may be configured to classify speech data or feature(s) with emotion label(s) as "biased towards male perspective" or "biased towards female perspective".

It should be noted that the disclosure does not limit the format or content of the emotion labels, and those skilled in the art can design or adjust them according to their needs. In some implementations, the speech data may correspond to a single binary emotion (e.g., whether being happy); in some implementations, the speech data may correspond to multiple binary emotions (e.g., whether being happy, whether being angry, whether being depressed, etc.). In some implementations, the speech data may correspond to a single quantified emotion (e.g., happiness score). In some implementations, the speech data may correspond to multiple quantified emotions (e.g., happiness score, anger score, depression score, etc.).

In some implementations, the domain classifier 110 may be a deep neural network including fully-connected layers, but may not be limited to the example provided in the present disclosure. In other implementations, as long as the input data can be classified as mentioned above, the specific architecture of the domain classifier 110 is not limited by the present disclosure.

On the other hand, the speech emotion recognition model 120 may act as the generator of the FCAN 100 that generates fair embedding(s) corresponding to the input data and determine or predict the emotion(s) corresponding to the input data.

In some implementations, the speech emotion recognition model 120 may be a deep neural network composed of fully-connected layers, but may not be limited to the example provided in the present disclosure. In other implementations, as long as fair embeddings corresponding to the input data can be generated and the emotions corresponding to the input data can be determined or predicted, the specific architecture of the speech emotion recognition model 120 is not limited by the present disclosure.

In some implementations, within the architecture of the speech emotion recognition model 120, there may be at least one fully-connected layer before the output layer. For example, the layer before the output layer of the speech emotion recognition model 120 may be a fully-connected layer. The fair embedding corresponding to the input data may be obtained by extracting the fully-connected layer, and the emotion corresponding to the input data may be obtained through the output layer.

Referring to FIGS. 1 and 2, in action S220, the FCAN 100 may be trained according to a labeled training set 200 with known biases and a first loss function to obtain the speech emotion recognition model 120 without bias (e.g., an unbiased speech emotion recognition model 120).

In some implementations, the labeled training set 200 may include multiple training data, each corresponding to an overall emotion label. In some implementations, in addition to the overall emotion label, each training data may correspond to multiple perspective emotion labels from multiple perspectives.

Specifically, the overall emotion label corresponding to each training data may be determined by a joint vote of multiple evaluators, so the result of the vote may contain evaluator biases. More specifically, the evaluators participating in the vote may include different types of evaluators. Each type of evaluator will evaluate from their perspective, resulting in multiple perspective emotion labels from multiple perspectives. However, there may be no consensus between each type of evaluator, leading to the final voting result (e.g., the overall emotion label) being biased towards a specific type of evaluator or a specific perspective, thus generating evaluator biases.

For example, when the overall emotion label corresponding to each training data is determined by a joint vote of evaluators of different genders, there may be no consensus between male and female evaluators, e.g., the evaluation result voted by male evaluators is different from that voted by female evaluators (e.g., the male perspective emotion label is different from the female perspective emotion label). In the case of disagreement, the final voting result may have gender bias. For example, the final voting result may be the same as the evaluation result voted by male evaluators and different from the evaluation result voted by female evaluators (e.g., biased towards the male perspective), or the final voting result may be the same as the evaluation result voted by female evaluators and different from the evaluation result voted by male evaluators (e.g., biased towards the female perspective). On the other hand, when there is a consensus between male and female evaluators, the final voting result will not have gender bias. For example, the final voting result may be the same as the evaluation result voted by male evaluators and the same as the evaluation result voted by female evaluators.

In some implementations, the labeled training set 200 with known biases may be divided into an unbiased first labeled training set S1 and a biased second labeled training set S2, where each training data in the second labeled training set S2 corresponds to a bias type (e.g., a first bias type or a second bias type).

For example, when the overall emotion label corresponding to a training data is the same as the male perspective emotion label and the same as the female perspective emotion label, this training data belongs to the first labeled training set S1. When the overall emotion label corresponding to a training data is the same as the male perspective emotion label and different from the female perspective emotion label, this training data is "biased towards the male perspective" and belongs to the second labeled training set S2. When the overall emotion label corresponding to a training data is the same as the female perspective emotion label and different from the male perspective emotion label, this training data is "biased towards the female perspective" and belongs to the second labeled training set S2.

Since the domain classifier 110 in the FCAN 100 is configured for bias classification, e.g., classifying the input data as "a first bias type" or "a second bias type", the biased second labeled training set S2 may be used to train the domain classifier 110 in a supervised manner, including calculating the first loss associated with the domain classifier 110. On the other hand, the speech emotion recognition model 120 in the FCAN 100 is configured for emotion determination, e.g., determining the emotion label corresponding to the input data, so both the unbiased first labeled training set S1 and the biased second labeled training set S2 may be used to train the speech emotion recognition model 120 in a supervised manner, including calculating the second loss associated with the speech emotion recognition model 120.

It should be noted that, apart from the characteristics of the training data, the present disclosure does not provide detailed descriptions and limitations on the format of the training data. In some implementations, the training data may be the original speech signal. In some implementations, the training data may be features obtained by acoustic feature extraction (e.g., eGeMAPS feature extraction) of the speech signal. In some implementations, the training data may be preprocessed data of speech data based on pre-trained models such as wav2vec, vq-wav2vec, HuBert, or Whisper, etc.

In some implementations, the FCAN 100 may be designed to encourage the speech emotion recognition model 120 to generate unbiased embeddings based on the input data (e.g., in the fully-connected layer before the output layer) and at the same time suppress the ability of the domain classifier 110 to classify the bias of the generated embedding. In this way, when the generated embedding of the speech emotion recognition model 120 is difficult for the domain classifier 110 to distinguish its bias, it indicates that the speech emotion recognition model 120 has been trained to generate fair or unbiased embeddings and can also generate fair or unbiased emotion prediction results.

The above objective may be achieved by designing the first loss function $L_{REP}$ used when training the FCAN 100.

In some implementations, the first loss function $L_{REP}$ may be negatively correlated with the first loss $L_1$ associated with the domain classifier 110 (e.g., Adversarial Loss) and may be positively correlated with the second loss $L_2$ associated with the speech emotion recognition model 120. For instance, the first loss function $L_{REP}$ may be represented as:

$$L_{REP} = -L_1 + L_2$$

In some implementations, the first loss $L_1$ and the second loss $L_2$ may be, for example, the cross-entropy loss of the domain classifier 110 and the speech emotion recognition model 120, respectively. However, the present disclosure does not limit the types of the first loss $L_1$ and the second loss $L_2$, and those skilled in the art can choose or design them according to their needs.

In some implementations, the first loss function $L_{REP}$ may be further correlated with the Wasserstein Distance (WD) loss $L_D$ associated with the domain classifier 110. For example, the first loss function $L_{REP}$ may be represented as:

$$L_{REP} = -L_1 + \alpha L_D + L_2,$$

where $\alpha$ is a hyperparameter.

In some implementations, the Wasserstein distance loss $L_D$ may be obtained by calculating the Wasserstein distance between the features classified as "a first bias type" (e.g., biased towards male) and "a second bias type" (e.g., biased towards female) by the domain classifier 110.

Thus, using the labeled training set 200 with known biases, the parameters of the FCAN 100 may be trained by minimizing the first loss function $L_{REP}$, and the speech emotion recognition model 120 may be simultaneously trained to be unbiased. Those skilled in the art can learn the training methods of the FCAN from relevant literature, so specific details are not further elaborated here.

Table 1 below shows the fairness of the unbiased speech emotion recognition model 120 trained according to implementations of the present disclosure using the statistical parity score. The dataset used is a biased subset of the IEMOCAP speech emotion database.

TABLE 1

| | Statistical Parity Score (Ideal = 0) | | | | |
|---|---|---|---|---|---|
| | Neutral | Happiness | Anger | Sadness | Frustration |
| DNN | 0.650 | 0.428 | 0.389 | 0.169 | 0.626 |
| LFR | 0.350 | 0.142 | 0.194 | 0.069 | 0.493 |
| NRL | 0.332 | 0.134 | 0.197 | 0.068 | 0.452 |
| FairRep$_G$ | 0.342 | 0.128 | 0.197 | 0.106 | 0.472 |
| FairRep$_F$ | 0.350 | 0.136 | 0.208 | 0.104 | 0.467 |
| FairRep | 0.350 | 0.126 | 0.189 | 0.088 | 0.448 |

In Table 1, DNN represents a deep neural network, LFR represents the model from "Learning fair representations" published in 2013 by Rich Zemel, Yu Wu, Kevin Swersky, Toni Pitassi, and Cynthia Dwork, et al., NRL represents the model from "Learning fair representations via an adversarial framework" published in 2019 by Rui Feng, Yang Yang, Yuehan Lyu, Chenhao Tan, Yizhou Sun, and Chunping Wang, et al., FairRep$_G$ represents the speech emotion recognition model 120 trained according to an implementation of the present disclosure without considering the first loss $L_1$ (e.g., Adversarial Loss), FairRep$_F$ represents the speech emotion recognition model 120 trained according to an implementation of the present disclosure without considering the Wasserstein Distance loss $L_D$, and FairRep represents the unbiased speech emotion recognition model 120 trained according to an implementation of the present disclosure considering both the first loss $L_1$ and the Wasserstein Distance loss $L_D$.

In Table 1, in comparison to previous models, the unbiased speech emotion recognition model 120 trained according to the implementation of the present disclosure performs better in almost every emotion.

Furthermore, Table 1 demonstrates that when considering the Wasserstein Distance loss $L_D$ in training the speech emotion recognition model 120, compared to not considering the Wasserstein Distance loss $L_D$, a better-performing speech emotion recognition model 120 can be trained.

Multi-Perspective Speech Emotion Recognition Model

Figure 3:
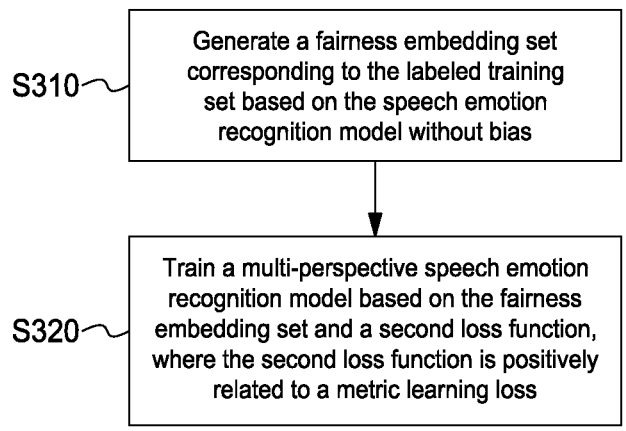
FIG. 3 illustrates a flowchart for training a multi-perspective speech emotion recognition model according to an example implementation of the present disclosure.

FIG. 3 illustrates a flowchart for training a multi-perspective speech emotion recognition model according to an example implementation of the present disclosure.

Referring to FIGS. 1 and 3, in action S310, based on the speech emotion recognition model 120 without bias (e.g., unbiased speech emotion recognition model 120), fair embedding set 200' corresponding to the labeled training set 200 with known biases may be generated. Specifically, the fair embedding set 200' may include fair embeddings corresponding to each training data in the labeled training set 200.

In some implementations, within the architecture of the speech emotion recognition model 120, there may be at least one fully-connected layer before the output layer. For instance, the layer before the output layer of the speech emotion recognition model 120 may be a fully-connected layer. Thus, by inputting each training data from the labeled training set 200 into the speech emotion recognition model 120 without bias, the corresponding fair embedding may be obtained by extracting the aforementioned fully-connected layer. Accordingly, the fair embedding set 200' corresponding to the labeled training set 200 may be obtained.

In some implementations, each training data may correspond to an overall emotion label and multiple perspective emotion labels from various perspectives. Therefore, each fair embedding in the fair embedding set 200' may also correspond to an overall emotion label and multiple perspective emotion labels from various perspectives.

In action S320, the multi-perspective speech emotion recognition model 130 may be trained based on the fair embedding set 200' and a second loss function, where the second loss function is positively correlated with a metric learning loss.

In some implementations, the multi-perspective speech emotion recognition model 130 may be designed to generate emotion prediction results from multiple perspectives. For example, each training data in the labeled training set 200 may correspond to an overall emotion label: a male perspective emotion label; and a female perspective emotion label. According to some implementations of the disclosure, the multi-perspective speech emotion recognition model 130 trained based on the labeled training set 200 may be designed to generate emotion prediction results from both the male and female perspectives.

In some implementations, the multi-perspective speech emotion recognition model 130 may be a deep neural network including fully-connected layers, but may not be limited to the example provided in the present disclosure. In other implementations, as long as fair embeddings corresponding to the input data can be generated and emotions from multiple perspectives can be predicted, the specific architecture of the multi-perspective speech emotion recognition model 130 is not limited by the present disclosure.

To train the multi-perspective speech emotion recognition model 130, in addition to obtaining the overall emotion label corresponding to each fair embedding in the fair embedding set 200', it may be also necessary to obtain multiple perspective emotion labels corresponding to each fair embedding.

Taking FIG. 1 as an example, corresponding to the multiple fair embeddings in the fair embedding set 200', multiple perspective emotion labels of the first perspective 210 (e.g., male perspective) are represented by the first array A1 as [0, 1, 1, 0, 1, . . . , 1, 0, 0], and multiple perspective emotion labels of the second perspective 220 (e.g., female perspective) are represented by the second array A2 as [1, 1, 0, 1, 0, . . . , 0, 0, 1]. From the perspective emotion labels of the first perspective 210 and the second perspective 220 corresponding to the first fair embedding (e.g., the first elements of arrays A1 and A2), no consensus can be observed between the evaluators of the first perspective 210 (e.g., male evaluators) and the second perspective 220 (e.g., female evaluators) regarding the training data corresponding to the first fair embedding (e.g., biased training data). From the perspective emotion labels of the first perspective 210 and the second perspective 220 corresponding to the second fair embedding (e.g., the second elements of arrays A1 and A2), a consensus can be observed between the evaluators of the first perspective 210 and the second perspective 220 regarding the training data corresponding to the second fair embedding (e.g., unbiased training data).

Based on the fair embedding set 200', the parameters of the multi-perspective speech emotion recognition model 130 may be trained by minimizing the second loss function $L_{PER}$, thus enabling output of emotion prediction results from multiple perspectives.

In some implementations, the metric learning loss may include a triplet loss $L_T$, so the second loss function $L_{PER}$ is positively correlated with the triplet loss $L_T$.

In some implementations, an anchor a, a positive sample p, and a negative sample n of the triplet loss $L_T$ are set based on corresponding biases, which are associated with the overall emotion label and multiple perspective emotion labels from various perspectives. For instance, when multiple perspective emotion labels are inconsistent and the overall emotion label matches one of the perspective emotion labels, there is an indication of a presence of bias. When multiple perspective emotion labels are consistent, there is an indication of an absence of bias.

For example, in a case that the training data corresponding to the first fair embedding in the fair embedding set 200' belongs to the first bias type (e.g., biased towards males), meaning its overall emotion label (e.g., represented as "1") matches the perspective emotion label of the first perspective 210 (e.g., the first element "1" of the first array A1) but differs from the perspective emotion label of the second perspective 220 (e.g., the first element "0" of the second array A2), the anchor a corresponding to the first fair embedding may be set as the first fair embedding, the positive sample p may be set as other fair embeddings that corresponds to the same first bias type, and the negative sample n may be set as fair embeddings that corresponds to the second bias type and that is different from the first fair embedding. Accordingly, the triplet loss $L_T$ corresponding to the first fair embedding may be calculated.

For example, in a case that the training data corresponding to the third fair embedding in the fair embedding set 200' belongs to the second bias type (e.g., biased towards females), meaning the overall emotion label (e.g., represented as "0") matches the perspective emotion label of the second perspective 220 (e.g., the third element "0" of the second array A2) but differs from the perspective emotion label of the first perspective 210 (e.g., the third element "1" of the first array A1), the anchor a corresponding to the third fair embedding may be set as the third fair embedding, the positive sample p may be set as other fair embeddings that corresponds to the same second bias type, and the negative sample n may be set as fair embeddings that corresponds to the first bias type and that is different from the third fair embedding. Accordingly, the triplet loss $L_T$ corresponding to the third fair embedding may be calculated.

In some implementations, the second loss function $L_{PER}$ may be further positively correlated with the third loss $L_3$ that is associated with the multi-perspective speech emotion recognition model 130. For instance, the second loss function $L_{PER}$ may be represented as:

$$L_{PER} = L_3 + \lambda L_T,$$

where $\lambda$, for example, may be the weight between the third loss $L_3$ and the triplet loss $L_T$, which may be considered as a hyperparameter.

In some implementations, the third loss $L_3$ is associated with the perspective emotion labels of the multiple perspectives. For instance, the third loss $L_3$ may be a cross-entropy loss of the multi-perspective speech emotion recognition model 130. However, the present disclosure does not limit the type of the third loss $L_3$, and those skilled in the art can choose or design according to their needs.

In some implementations, the metric learning loss may include one or more of the following losses: a triplet loss, a quadruplet loss, an N-pair loss, a contrastive loss, and a center loss.

In some implementations, in addition to the metric learning loss and the third loss $L_3$, the second loss function $L_{PER}$ may also be associated with other types of losses, and the present disclosure does not limit the specific design of the second loss function.

Thus, using the fair embedding set 200', the parameters of the multi-perspective speech emotion recognition model 130 may be trained by minimizing the second loss function $L_{PER}$, thus enabling output of emotion prediction results from multiple perspectives.

Table 2 below reflects the performance of the multi-perspective speech emotion recognition model 130 trained according to the implementations of the present disclosure using a consistency score. The dataset used is a biased subset of the IEMOCAP emotion speech database.

TABLE 2

| | Consistency Score (Ideal = 1) | | | | |
| --- | --- | --- | --- | --- | --- |
| | Neutral | Happiness | Anger | Sadness | Frustration |
| DNN | 0.537 | 0.552 | 0.583 | 0.552 | 0.568 |
| LFR | 0.685 | 0.698 | 0.722 | 0.735 | 0.706 |
| NRL | 0.786 | 0.783 | 0.790 | 0.762 | 0.741 |
| FairRep$_G$ | 0.791 | 0.772 | 0.801 | 0.766 | 0.743 |
| FairRep$_F$ | 0.788 | 0.761 | 0.762 | 0.733 | 0.752 |
| FairRep | 0.802 | 0.777 | 0.809 | 0.739 | 0.760 |
| FairPer | 0.853 | 0.827 | 0.822 | 0.797 | 0.840 |

In Table 2, FairPer represents the multi-perspective speech emotion recognition model 130 trained according to the implementations considering the triplet loss $L_T$ and the third loss $L_3$.

In Table 2, in comparison to previous models, the multi-perspective speech emotion recognition model 130 trained according to the implementations of the present disclosure has a higher consistency score for data with more severe biases, which indicates that the predictions made by the multi-perspective speech emotion recognition model 130 for multiple perspectives are more consistent and perform better.

Application of Speech Emotion Recognition Model

Figure 4:
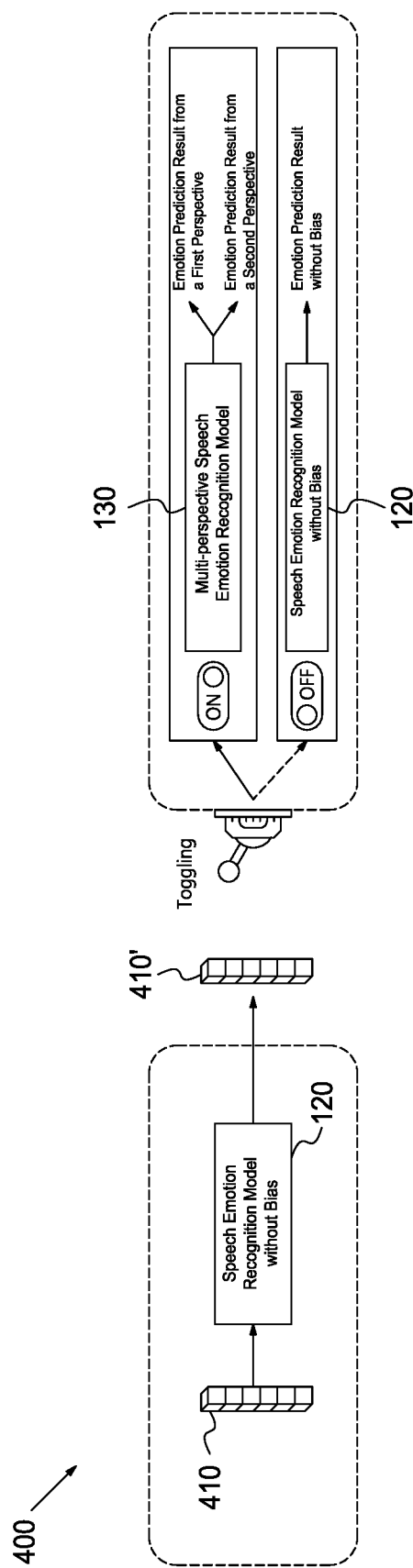
FIG. 4 illustrates a schematic diagram of a speech emotion recognition according to an example implementation of the present disclosure.
Figure 5:
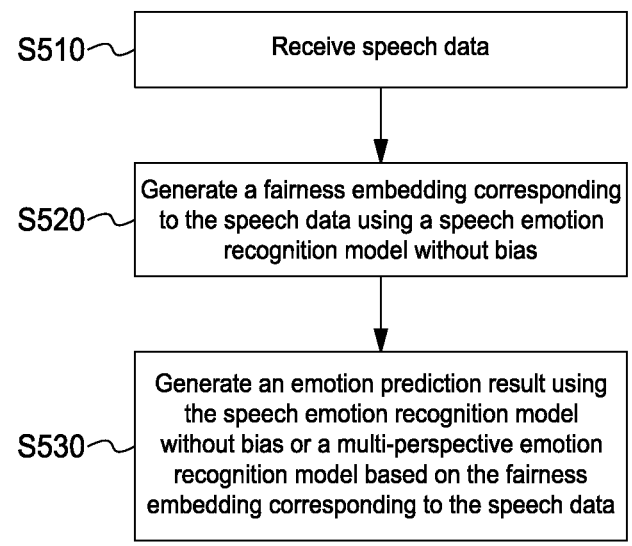
FIG. 5 illustrates a flowchart of a speech emotion recognition according to an example implementation of the present disclosure.

FIG. 4 illustrates a schematic diagram of a speech emotion recognition according to an example implementation of the present disclosure. FIG. 5 illustrates a flowchart of a speech emotion recognition according to an example implementation of the present disclosure.

Referring to FIGS. 4 and 5, the speech emotion recognition system 400 includes the (e.g., trained) speech emotion recognition model 120 without bias (e.g., also referred to as the unbiased speech emotion recognition model 120) and the (e.g., trained) multi-perspective speech emotion recognition model 130.

In step S510, speech data 410 may be received.

In some implementations, speech data 410 may be received from input components such as a microphone in the speech emotion recognition system 400. However, the source of speech data 410 may not be limited to the example provided in the present disclosure.

In step S520, the unbiased speech emotion recognition model 120 may first be used to generate a fair embedding 410' corresponding to the speech data 410.

In some implementations, in the architecture of the speech emotion recognition model 120, there is at least one fully-connected layer before the output layer. For example, the layer before the output layer of the speech emotion recognition model 120 is a fully-connected layer. Therefore, by inputting the speech data 410 into the unbiased speech emotion recognition model 120, the corresponding fair embedding 410' may be obtained by extracting the fully-connected layer.

In some implementations, before inputting the speech data 410 into the unbiased speech emotion recognition model 120, data preprocessing, such as acoustic feature extraction, may be performed on the speech data 410. The methods for acoustic feature extraction or data preprocessing have been exemplified above, therefore description of the methods are not elaborated here.

In step S530, based on the fair embedding 410' corresponding to the speech data 410, emotion prediction result(s) may be generated using the unbiased speech emotion recognition model 120 and/or the multi-perspective speech emotion recognition model 130.

In some implementations, emotion prediction result(s) may correspond to a single binary emotion (e.g., whether being happy). In some implementations, emotion prediction result(s) may correspond to multiple binary emotions (e.g., whether being happy, whether being angry, whether being depressed, etc.). In some implementations, emotion prediction result(s) may correspond to a single quantified emotion (e.g., happiness score). In some implementations, emotion prediction result(s) may correspond to multiple quantified emotions (e.g., happiness score, anger score, depression score, etc.). In other words, the present disclosure does not limit the specific format of the emotion prediction result generated by the speech emotion recognition models 120 and 130, and those skilled in the art can design according to their needs.

In some implementations, after converting the speech data 410 to the fair embedding 410' using the unbiased speech recognition model 120 in step S520, the unbiased emotion prediction result may be directly obtained from the output layer of the unbiased speech recognition model 120 in step S530.

In some implementations, the fair embedding 410' corresponding to the speech data 410 may be input into the multi-perspective speech emotion recognition model 130 to generate emotion prediction results from multiple perspectives.

In some implementations, the speech emotion recognition system 400 may provide a toggling function, allowing users to choose at least one of the unbiased or multi-perspective speech emotion recognition services. If the user chooses the unbiased speech emotion recognition service, the system 400 may output the unbiased speech emotion recognition result. If the user chooses the first perspective of the multi-perspective service, the system 400 may output the emotion prediction result of the first perspective. If the user chooses the second perspective of the multi-perspective service, the system 400 may output the emotion prediction result of the second perspective, and so on.

For example, the speech emotion recognition system 400 may provide a toggling function, allowing users to choose at least one of the unbiased, male perspective, or female perspective speech emotion recognition services. If the unbiased speech emotion service is selected, the system 400 may output the unbiased speech emotion recognition result. If the male and/or female perspective speech emotion service is selected, the fair embedding 410' may be input into the multi-perspective speech emotion recognition model 130 to generate and output the emotion prediction result(s) of the male and/or female perspective.

In addition to providing unbiased speech emotion recognition services, implementations of the present disclosure further provide user-selectable specific perspective speech emotion recognition services. In this way, for users, the overall system is fairer and more valuable.

Figure 6:
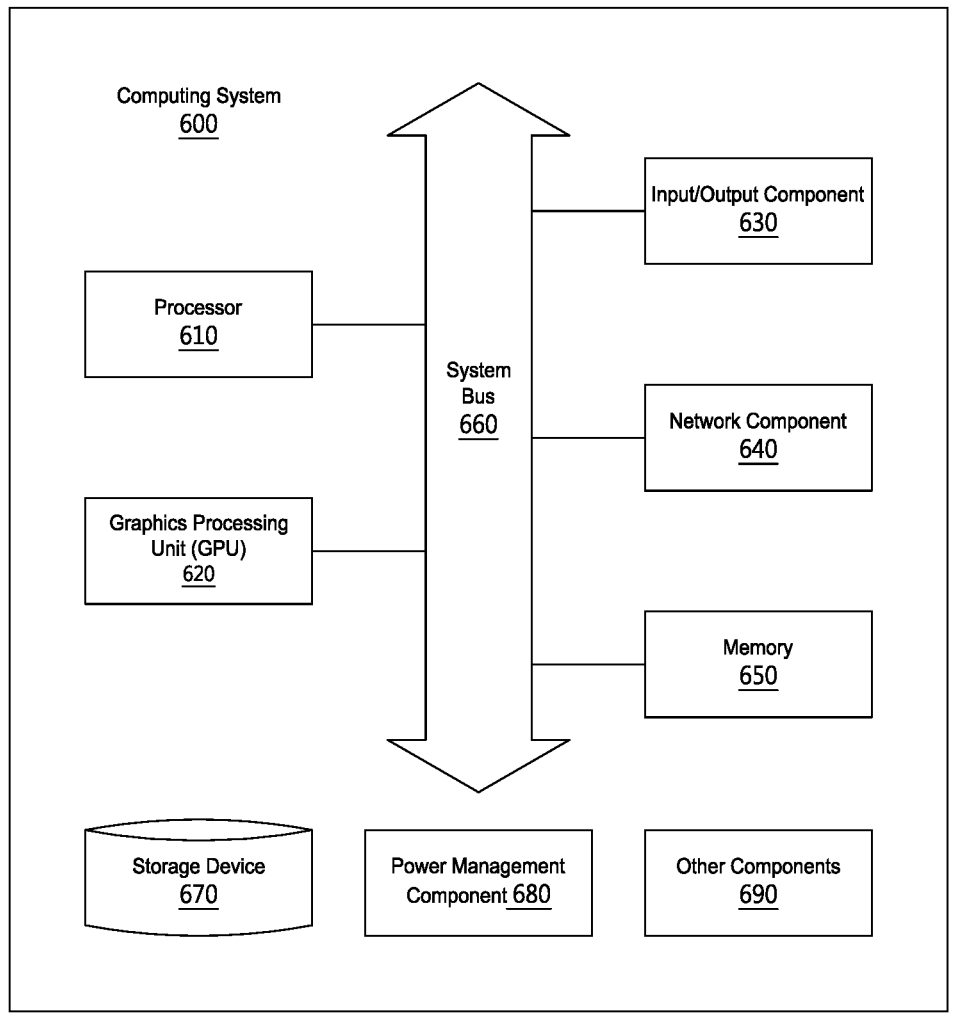
FIG. 6 illustrates a block diagram of a computing system according to an example implementation of the present disclosure.

FIG. 6 illustrates a block diagram of a computing system according to an example implementation of the present disclosure.

Referring to FIG. 6, computer-implemented methods such as methods for training the speech emotion recognition model and methods for speech emotion recognition introduced in this article, as well as other computer-implemented methods, may be implemented on a computing system 600 with various hardware components. In some implementations, the computing system 600 may be implemented in the form of an electronic device, which may include, but is not limited to, one or more of the following components: processor (e.g., Central Processing Unit (CPU)) 610, Graphics Processing Unit (GPU) 620, input/output components 630, network components 640, and memory 650. These components may communicate and transfer data via the system bus 660. However, the present disclosure does not limit the specific models, quantities, and configurations of these components. Those skilled in the art can adjust, select, or add/subtract components based on the specific requirements and operating environment when implementation.

In some implementations, the primary computing core inside the computing system 600 is one or more processors 610. This processor 610 may be responsible for running the main computational processes and related control logic of algorithms such as deep learning. In some implementations, the processor 610 may be configured to execute processing instructions (e.g., machine/computer-executable instructions) stored in non-volatile computer-readable media (e.g., storage device 670).

In some implementations, to enhance the computational efficiency of deep learning, the computing system 600 may also include one or more graphics processing unis 620 designed for massive parallel computations. The graphics processing unit 620 may effectively improve the system's computational capacity during deep learning training and inference.

In some implementations, the computing system 600 may include various input/output components 630 configured to receive user input and display system output. For example, the input/output components 630 may include a keyboard, mouse, touchpad, display screen, speakers, and other types of sensing devices.

In some implementations, the computing system 600 may also include network components 640 configured for network communication. For example, the network component 640 may include a network interface card for wired or wireless network connections, or communication modules for 3G, 4G, 5G, or other wireless communication technologies.

In some implementations, the computing system 600 may include one or more memory components 650, such as volatile memory components like Random Access Memory (RAM). The memory 650 may store the parameters of the deep learning model, as well as other data and programs used to run algorithms like deep learning.

Furthermore, the computing system 600 may also include one or more of the following components: storage devices 670, power management components 680, and other various hardware components 690.

In some implementations, the computing system 600 may include one or more storage devices 670, such as non-volatile memory components like Hard Disk Drive (HDD) or Solid State Drive (SSD). The storage devices 670 may be configured to store the code of deep learning software, training data, model parameters, etc. Additionally, storage devices 670 may also be configured to store intermediate results and final outputs of algorithms like deep learning.

In some implementations, the computing system 600 may include one or more power management components 680, configured to provide power to various hardware components of the computing system 600 and manage their power consumption. This power management component 680 may include batteries, power converters, and other power management devices.

In some implementations, the computing system 600 may also include other various hardware components 690, such as cooling fans, heat dissipators, and other various control and monitoring devices. The present disclosure is not limited in this regard.

Additionally, implementations of the present disclosure may also be implemented as one or more computer program products or one or more non-transitory computer-readable medium, which include one or more instructions of a computer program. Specifically, the computer program (also referred to as a program, software, script, or code) may be presented in any form of programming language and can be deployed in any form. During the operation of the computing system 600 (e.g., electronic device), the instructions or part of them may reside entirely or at least partially inside the processor 610, allowing the processor 610 to execute the methods introduced in the disclosure.

In summary, the speech emotion recognition method and system provided in the implementations of the disclosure enhance the performance of the trained and unbiased speech emotion recognition model by adding the Wasserstein distance loss to the loss function for training the fair constraint adversarial network. Furthermore, implementations of the disclosure provides a method of first learning a fair embedding and then further training a multi-perspective speech emotion recognition model using metric learning losses, such as triplet loss. In this way, in addition to providing users with unbiased speech emotion recognition services, optional speech recognition services from specific perspectives may further be provided to the users.

Based on the above description, it is apparent that various techniques can be configured to implement the concepts described in this application without departing from their scope. Furthermore, although certain implementations have been specifically described and illustrated, those skilled in the art will recognize that variations and modifications can be made in form and detail without departing from the scope of the concepts. Thus, the described implementations are to be considered in all respects as illustrative and not restrictive. Moreover, it should be understood that this application is not limited to the specific implementations described above, but many rearrangements, modifications, and substitutions can be made within the scope of the present disclosure.

What is claimed is:

1. A computer-implemented method for training a speech emotion recognition model, the method comprising:
    providing a fairness-constrained adversarial network comprising a domain classifier and a speech emotion recognition model, the domain classifier configured to classify a bias in an input data, and the speech emotion recognition model configured to determine an emotion corresponding to the input data; and
    training the fairness-constrained adversarial network, based on a labeled training set with known bias and a first loss function, to obtain the speech emotion recognition model without bias,
    wherein;
        the first loss function is positively related to a Wasserstein distance loss,
        the labeled training set with known bias comprises a plurality of training data, and
        each of the plurality of training data corresponds to an overall emotion label and a plurality of perspective emotion labels for a plurality of perspectives.

2. The computer-implemented method of claim 1, wherein the first loss function is negatively related to a first loss associated with the domain classifier and positively related to a second loss associated with the speech emotion recognition model.

3. The computer-implemented method of claim 1, wherein the domain classifier is configured to classify a binary bias.

4. The computer-implemented method of claim 3, wherein the binary bias comprises an evaluator gender bias.

5. The computer-implemented method of claim 1, further comprising:
    generating a fairness embedding set corresponding to the labeled training set based on the speech emotion recognition model without bias; and
    training a multi-perspective speech emotion recognition model based on the fairness embedding set and a second loss function,
    wherein the multi-perspective speech emotion recognition model is configured to generate a plurality of perspective-specific emotion prediction results corresponding to the plurality of perspectives, and the second loss function is positively related to a metric learning loss.

6. The computer-implemented method of claim 5, wherein;
    the metric learning loss comprises a triplet loss, and
    an anchor, a positive sample, and a negative sample of the triplet loss are set based on the overall emotion label and the plurality of perspective emotion labels.

7. The computer-implemented method of claim 5, wherein the metric learning loss comprises at least one of a triplet loss, a quadruplet loss, an N-pair loss, a contrastive loss, or a center loss.

8. The computer-implemented method of claim 5, wherein the second loss function is positively related to a third loss associated with the multi-perspective speech emotion recognition model, and the third loss is associated with the plurality of perspective emotion labels.

9. A computer-implemented method for speech emotion recognition, the method comprising:
    receiving speech data; and
    generating an emotion prediction result corresponding to the speech data based on the speech data and a speech emotion recognition model without bias, wherein:
        the speech emotion recognition model without bias is trained by training a fairness-constrained adversarial network based on a labeled training set with known bias and a first loss function,
        the first loss function is positively related to a Wasserstein distance loss,
        the fairness-constrained adversarial network comprises a domain classifier for bias classification and the speech emotion recognition model, and
        the labeled training set with known bias comprises a plurality of training data, and each of the plurality of training data corresponds to an overall emotion label and a plurality of perspective emotion labels for a plurality of perspectives.

10. The computer-implemented method of claim 9, wherein the first loss function is negatively related to a first loss associated with the domain classifier and positively related to a second loss associated with the speech emotion recognition model.

11. The computer-implemented method of claim 9, wherein the domain classifier is configured to classify a binary bias.

12. The computer-implemented method of claim 11, wherein the binary bias comprises an evaluator gender bias.

13. The computer-implemented method of claim 9, further comprising:
    generating a fairness embedding corresponding to the speech data based on the speech data and the speech emotion recognition model without bias; and
    generating at least one of a plurality of perspective-specific emotion prediction results corresponding to the speech data based on the fairness embedding and a multi-perspective speech emotion recognition model, wherein:
        the multi-perspective speech emotion recognition model is trained based on a fairness embedding set corresponding to the labeled training set and a second loss function,
        the fairness embedding set is generated based on the speech emotion recognition model without bias, and the second loss function is positively related to a metric learning loss.

14. The computer-implemented method of claim 13, wherein;
the metric learning loss comprises a triplet loss, and
an anchor, a positive sample, and a negative sample of the triplet loss are set based on the overall emotion label and the plurality of perspective emotion labels.

15. The computer-implemented method of claim 13, wherein the metric learning loss comprises at least one of a triplet loss, a quadruplet loss, an N-pair loss, a contrastive loss, or a center loss.

16. The computer-implemented method of claim 13, wherein the second loss function is positively related to a third loss associated with the multi-perspective speech emotion recognition model, and the third loss is associated with the plurality of perspective emotion labels.

17. A non-transitory computer-readable medium, comprising at least one instruction, when executed by a processor of an electronic device, causes the electronic device to:
receive speech data; and
generate an emotion prediction result corresponding to the speech data based on the speech data and a speech emotion recognition model without bias, wherein:
the speech emotion recognition model without bias is trained by training a fairness-constrained adversarial network based on a labeled training set with known bias and a first loss function,
the first loss function is positively related to a Wasserstein distance loss,
the fairness-constrained adversarial network comprises a domain classifier for bias classification and the speech emotion recognition model, and
the labeled training set with known bias comprises a plurality of training data, and each of the plurality of training data corresponds to an overall emotion label and a plurality of perspective emotion labels for a plurality of perspectives.

* * * * *